Nov. 24, 1959  R. WEEKS, JR  2,914,689
MOTOR BRUSH ASSEMBLY
Filed Sept. 24, 1957  2 Sheets-Sheet 1

INVENTOR.
ROBERT WEEKS, JR.
BY
*Thomas C. Betts*
HIS ATTORNEY

Nov. 24, 1959 — R. WEEKS, JR — 2,914,689
MOTOR BRUSH ASSEMBLY
Filed Sept. 24, 1957 — 2 Sheets-Sheet 2
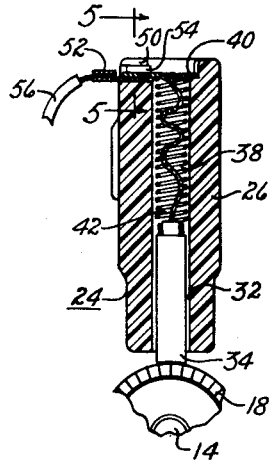
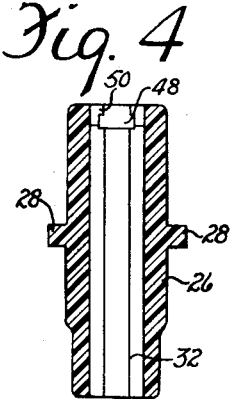
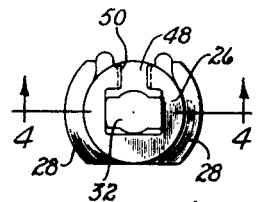
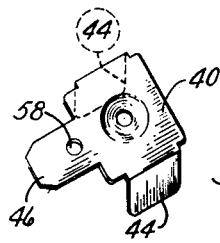
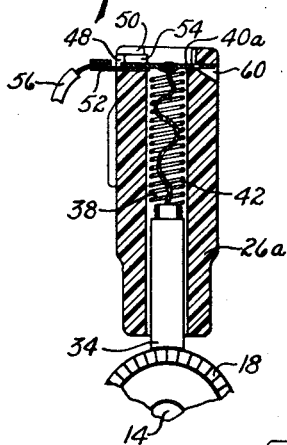
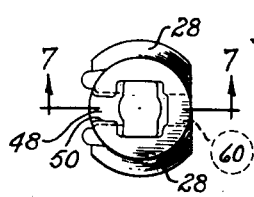
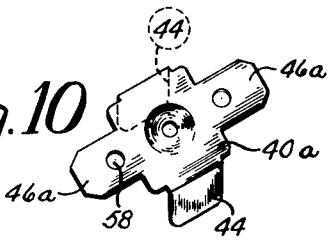
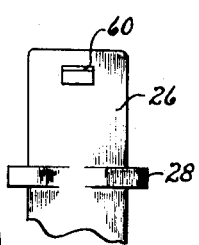
INVENTOR.
ROBERT WEEKS, JR.
BY Thomas C. Betts
HIS ATTORNEY 200
United States Patent Office 2,914,689
Patented Nov. 24, 1959

2,914,689
MOTOR BRUSH ASSEMBLY

Robert Weeks, Jr., Old Greenwich, Conn., assignor to Electrolux Corporation, Old Greenwich, Conn., a corporation of Delaware Application September 24, 1957, Serial No. 685,838

6 Claims. (Cl. 310—247)

My invention relates to motor brush assemblies and more particularly to an improved arrangement for securing the clip, which retains the brush spring, to the brush holder.

In accordance with my invention this clip is secured to the brush holder by means of engagement with a terminal member which also connects the clip electrically to a motor lead, without the use of screws or other special fastening means.

Further objects and advantages of my invention will be apparent from the following description when considered in connection with the accompanying drawings which form a part of this specification and of which:

Fig. 2 is a cross-sectional view of the brush assembly and a portion of the motor commutator taken on the line 2—2 of Fig. 1;

Fig. 3 is an end view of the brush holder forming part of the assembly shown in the preceding figures;

Fig. 4 is a cross-sectional view taken on the line 4—4 of Fig. 3;

Fig. 6 is a perspective view of a clip forming part of the assembly shown in Figs. 1 and 2;

Fig. 7 is a cross-sectional view similar to Fig. 2, but showing a modified embodiment of my invention;

Fig. 8 is an end view of the brush holder forming part of the assembly shown in Fig. 7;

Fig. 9 is a view looking towards the right in Fig. 7; and

Fig. 10 is a perspective view of the clip forming part of the assembly shown in Fig. 7.

Figure 1:
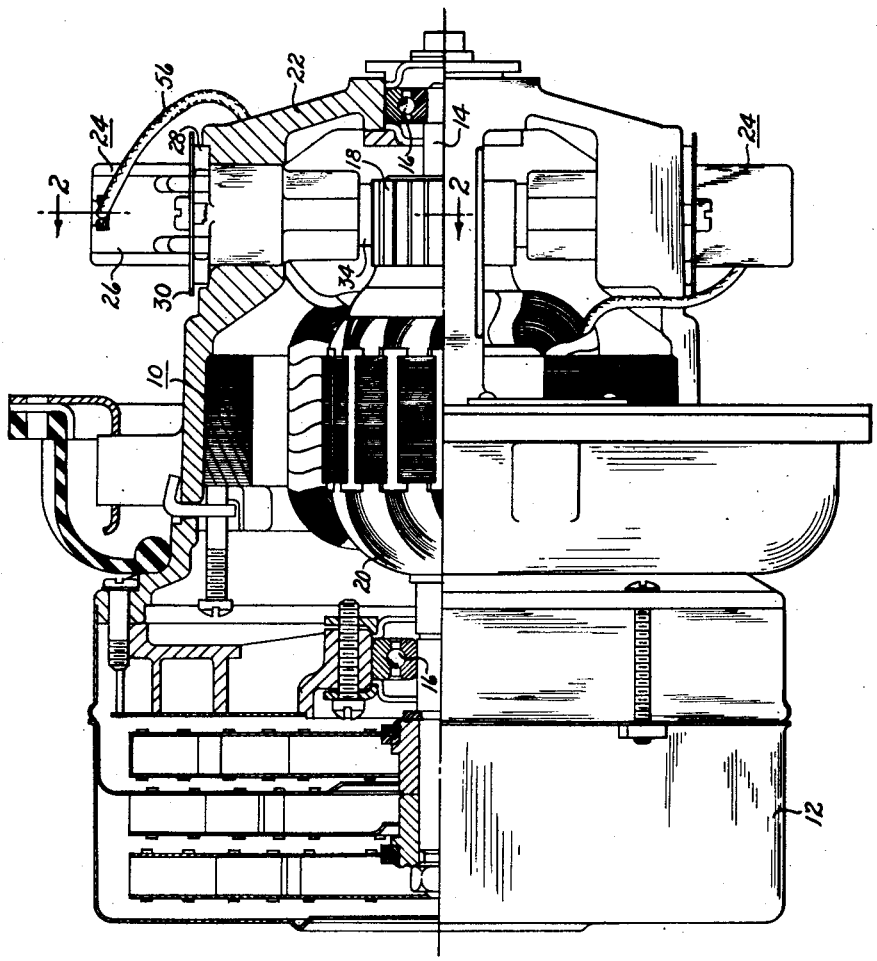
Fig. 1 is a view, partially in cross-section, showing an electric motor provided with my improved brush assembly.

Referring to the drawings, reference character 10 designates an electric motor driving a two-stage centrifugal blower 12. A motor shaft 14 is mounted in suitable bearings 16 and carries a commutator 18 and an armature winding 20. The bearings are mounted in a usual frame 22 in which is also mounted a pair of brush assemblies designated generally by reference character 24.

Each assembly includes a brush holder 26 formed with outwardly extending flanges 28 which are held against an outer surface of the motor frame by means of a clamping ring 30. The inner end of the holder 26 extends through an opening in the motor frame in alignment with the commutator 18, the holder itself terminating a short distance from the cylindrical surface of the commutator. The holder 26 is formed with a lengthwise extending passageway 32 generally rectangular in cross-section in which is slidably received a rectangular carbon brush 34, the lower end of which is urged against the surface of the commutator by means of a brush spring 38 which is disposed in the passageway 32 between the brush and a clip member 40. A flexible electrical conductor 42, commonly known as a pigtail, connects the brush 34 electrically with the clip 40.

Figure 5:
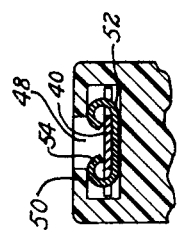
Fig. 5 is a cross-sectional view on an enlarged scale taken on the line 5—5 of Fig. 2.

As is shown more particularly in Fig. 6, the clip is formed with a pair of parallel legs 44 which extend downwardly within the rectangular passageway 32 of the brush holder, and in addition has a laterally extending projection 46 which is received in a notch or opening 48 formed in the side of the brush holder at the outer end thereof. As may be seen more particularly in Figs. 4 and 5, the brush holder is formed with projecting lips 50 which reduce the width of the opening at the upper end of the notch 48 to less than the width of the remaining portion of the notch. The width of the projection 46 on the clip 40 is no greater than the distance between the lips 50, and consequently the clip may be placed in position at the outer end of the brush holder by moving it in a direction lengthwise of the passageway 32, the projection 46 passing between the projections 50 and the legs 44 entering the passageway.

In order to retain the clip 40 in this position against the force of the spring 38, and at the same time provide an electric connection to the clip, a terminal member 52 is provided with a slot in one end thereof formed by curling over the sides of the terminal, as is shown at 54. This slot is so dimensioned as to cause the terminal to frictionally engage the projection 46 of the clip when the terminal is moved laterally through the notch 48. As will be seen particularly from Fig. 5, the outer dimensions of the end of the terminal 52 which enters the notch 48 are such that the terminal cannot move lengthwise of the holder because it is too wide to pass between the lips 50 which reduce the size of the opening at the top of the notch 48. A lead wire 56 is secured to the outer end of the terminal 52. Consequently when the terminal is introduced into the notch 48 to frictionally engage the projection 46 therein, it serves to prevent lengthwise displacement of the clip under the force of spring 38, and at the same time provides an electrical connection between the lead 56 and the clip, which in turn is connected to the brush by means of the pigtail 42. If desired, the projection 46 may be formed with an opening or depression 58 which may cooperate with a dimple on the terminal 52 in order to more securely hold these two parts together.

The embodiment shown in Figs. 7 through 10 differs from that previously described in that the clip, here designated 40 is provided with two projections 46a which preferably are identical with each other. The brush holder 26a is formed with a recess or opening 60 located diametrically opposite the notch 48. As is shown, the lower surface of this opening 60 is inclined outwardly and downwardly. In order to assemble the clip in the holder, it is held in an inclined position parallel to the inclined surface of the opening 60. In this position one of the projections 46a may be inserted into the opening 60 and thereafter the clip may be pivoted to the position shown in Fig. 7, where it is normal to he axis of the holder, the other projection 46a entering the notch 48 through the reduced open end thereof. Thereafter, a terminal member 52 may be inserted into the notch 48 and frictionally engaged with the projection 46a therein in the same manner as above described.

It will be noted that with this embodiment both ends of the clip are held against displacement under the action of the spring, one end by virtue of the projection 46a being received in the opening 60 and the other end by virtue of the locking projection 46a in the notch 48.

While I have shown and described two more or less specific embodiments of my invention, it is to be understood that this has been done for purposes of illustration only and that the scope of my invention is not to be limited thereby, but is to be determined from the appended claims.

What I claim is:

1. In a brush assembly, a brush holder having a passageway therethrough, a brush slidably positioned in one end of said passageway, a clip disposed across the other end of said passageway and having a laterally extending projection, a compression spring in said passageway between said brush and said clip, means for conducting electricity between said brush and said clip, said holder having an opening through the side thereof adjacent to said other end, and a terminal member movable laterally into said opening and frictionally engageable with said projection for establishing an electrical connection with said clip and for securing said clip in said holder against the force of said spring.

2. In a brush assembly, a brush holder having a passageway therethrough, a brush slidably positioned in one end of said passageway, a clip disposed across the other end of said passageway and having a projection extending laterally into a notch in the side of said holder, a compression spring in said passageway between said brush and said clip, means for conducting electricity between said brush and said clip, and a terminal member movable laterally into said notch to frictionally engage said projection therein for establishing an electrical connection with said clip and for securing said clip in said holder against the force of said spring.

3. In a brush assembly, a brush holder having a passageway therethrough and having a notch in the side thereof at one end, a brush slidably positioned in the other end of said passageway, a clip having a laterally extending projection and being movable in a direction lengthwise of said passage into said one end thereof with said projection entering said notch, a compression spring in said passageway between said brush and said clip, and a terminal clip movable laterally into said notch to frictionally engage said projection therein for establishing an electrical connection with said clip and for securing said clip in said holder against the force of said spring.

4. In a brush assembly, a brush holder having a passageway therethrough, a brush slidably positioned in one end of said passageway, a clip disposed across the other end of said passageway and having a projection extending laterally through a notch in the side of said holder, a compression spring in said passageway between said brush and said clip, means for conducting electricity between said brush and said clip, and a terminal member formed with a slot and movable into said notch to frictionally receive said projection in said slot for establishing an electrical connection with said clip and for securing said clip in said holder against the force of said spring.

5. In a brush assembly, a brush holder having a passageway therethrough, a brush slidably positioned in one end of said passageway, a clip disposed across the other end of said passageway and having a projection extending laterally through an open ended notch in the side of said holder, a compression spring in said passageway between said brush and said clip, means for conducting electricity between said brush and said clip, the opening at the open end of said notch being narrower than the remainder of the notch and at least as wide as said projection, and a terminal member wider than said opening and introduceable laterally into the broader portion of said notch to frictionally engage said projection therein for establishing an electrical connection with said clip and for securing said clip in said holder against the force of said spring.

6. In a brush assembly, a brush holder having a passageway therethrough, a brush slidably positioned in one end of said passageway, a clip disposed across the other end of said passageway and having a pair of oppositely extending lateral projections, one of said projections extending into a notch in one side of said holder and the other being received in a recess in the opposite side of said holder, a compression spring in said passageway between said brush and said clip, means for conducting electricity between said brush and said clip, and a terminal member wider than said projection movable laterally into said notch to frictionally engage the projection in said notch for establishing an electrical connection with said clip and for securing said clip in said holder against the force of said spring.

References Cited in the file of this patent

UNITED STATES PATENTS

| 626,708 | Lundell | June 13, 1899 |
| 2,211,006 | Daughman | Aug. 13, 1940 |
| 2,482,921 | Malchus | Sept. 27, 1949 |
| 2,548,631 | Stapleton | Apr. 10, 1951 |

FOREIGN PATENTS

| 741,328 | Germany | Nov. 10, 1943 |